US011872806B2

(12) United States Patent
Ito et al.

(10) Patent No.: US 11,872,806 B2
(45) Date of Patent: Jan. 16, 2024

(54) RECORDING DEVICE

(71) Applicant: SEIKO EPSON CORPORATION, Tokyo (JP)

(72) Inventors: Shun Ito, Matsumoto (JP); Haruna Takahashi, Ina (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 17/650,120

(22) Filed: Feb. 7, 2022

(65) Prior Publication Data

US 2022/0250399 A1 Aug. 11, 2022

(30) Foreign Application Priority Data

Feb. 9, 2021 (JP) ................................ 2021-018855

(51) Int. Cl.
*B41J 11/00* (2006.01)

(52) U.S. Cl.
CPC ................................ *B41J 11/0085* (2013.01)

(58) Field of Classification Search
CPC .............................. B41J 11/0085; B41J 15/04
See application file for complete search history.

(56) References Cited

U.S. PATENT DOCUMENTS

2010/0118098 A1* 5/2010 Ebihara .................... B41J 2/155
347/104
2016/0347091 A1* 12/2016 Onuma .................... B41J 11/06

FOREIGN PATENT DOCUMENTS

JP 2012-030377 A 2/2012
JP 2014124830 A * 7/2014

* cited by examiner

*Primary Examiner* — Justin Seo
*Assistant Examiner* — Tracey M McMillion
(74) *Attorney, Agent, or Firm* — WORKMAN NYDEGGER

(57) ABSTRACT

A printer includes a recording unit, a platen unit, and a driving unit. The platen unit includes a support surface, a negative pressure chamber, a first suction port, a second suction port, and a third suction port, and a partition mechanism. The partition mechanism includes a shutter member, a lever member, and a coupling unit. The driving unit includes a motor and a cam. The coupling unit couples the shutter member and the lever member with a predetermined idle angle.

12 Claims, 12 Drawing Sheets

RECORDING DEVICE

The present application is based on, and claims priority from JP Application Serial Number 2021-018855, filed Feb. 9, 2021, the disclosure of which is hereby incorporated by reference herein in its entirety.

BACKGROUND

1. Technical Field

The present disclosure relates to a recording device.

2. Related Art

The recording device described in JP-A-2012-30377 includes a plurality of pressure switching valves that divide the inside of the suction duct into a plurality of negative pressure chambers and that open and close the plurality of negative pressure chambers in conjunction with rotation.

As in the recording device of JP-A-2012-30377, in a configuration in which driving an opening/closing member that divides a negative pressure chamber opens and closes the negative pressure chamber, it is assumed that the opening/closing member is provided at a site having the negative pressure chamber, and that a driving unit that drives the opening/closing member is provided in a device main body. In this case, due to position error of the opening/closing member and position error of the driving unit, there is a risk that the transmission of the driving force from the driving unit to the opening/closing member may be insufficient, and the opening/closing member may not sufficiently open the negative pressure chamber.

SUMMARY

In order to solve the above-described problems, a recording device according to an aspect of the present disclosure includes: a recording unit configured to perform recording on a transported recording medium, an facing unit disposed facing the recording unit, the facing unit including a support surface configured to support the recording medium, a negative pressure chamber provided on an opposite side of the support surface from the recording unit, a plurality of suction ports provided in the support surface and configured to put the negative pressure chamber and an outside of the support surface in communication with each other, and a partition mechanism provided in the negative pressure chamber and configured to divide the negative pressure chamber by being rotated, and a driving unit provided separately from the facing unit and configured to drive the partition mechanism, wherein the partition mechanism includes a partition wall extending inside the negative pressure chamber and configured to be displaceable between an open position in which the partition wall is in an open state along a bottom surface of the negative pressure chamber and a closed position in which the partition wall is upright from the bottom surface in a closed state, an abutting unit coupled to the partition wall and extending outside of the negative pressure chamber, the abutting unit being configured to displace the partition wall, and a coupling unit disposed at a bottom of the negative pressure chamber and configured to couple the partition wall and the abutting unit, the coupling unit including a rotation center of the partition mechanism, the driving unit includes a driving source configured to rotate and a cam configured to rotate the abutting unit in conjunction with rotation of the driving source and thereby displace the partition wall between the open position and the closed position, and the coupling unit couples the partition wall and the abutting unit with a predetermined idle angle.

DESCRIPTION OF EXEMPLARY EMBODIMENTS

Figure 1:
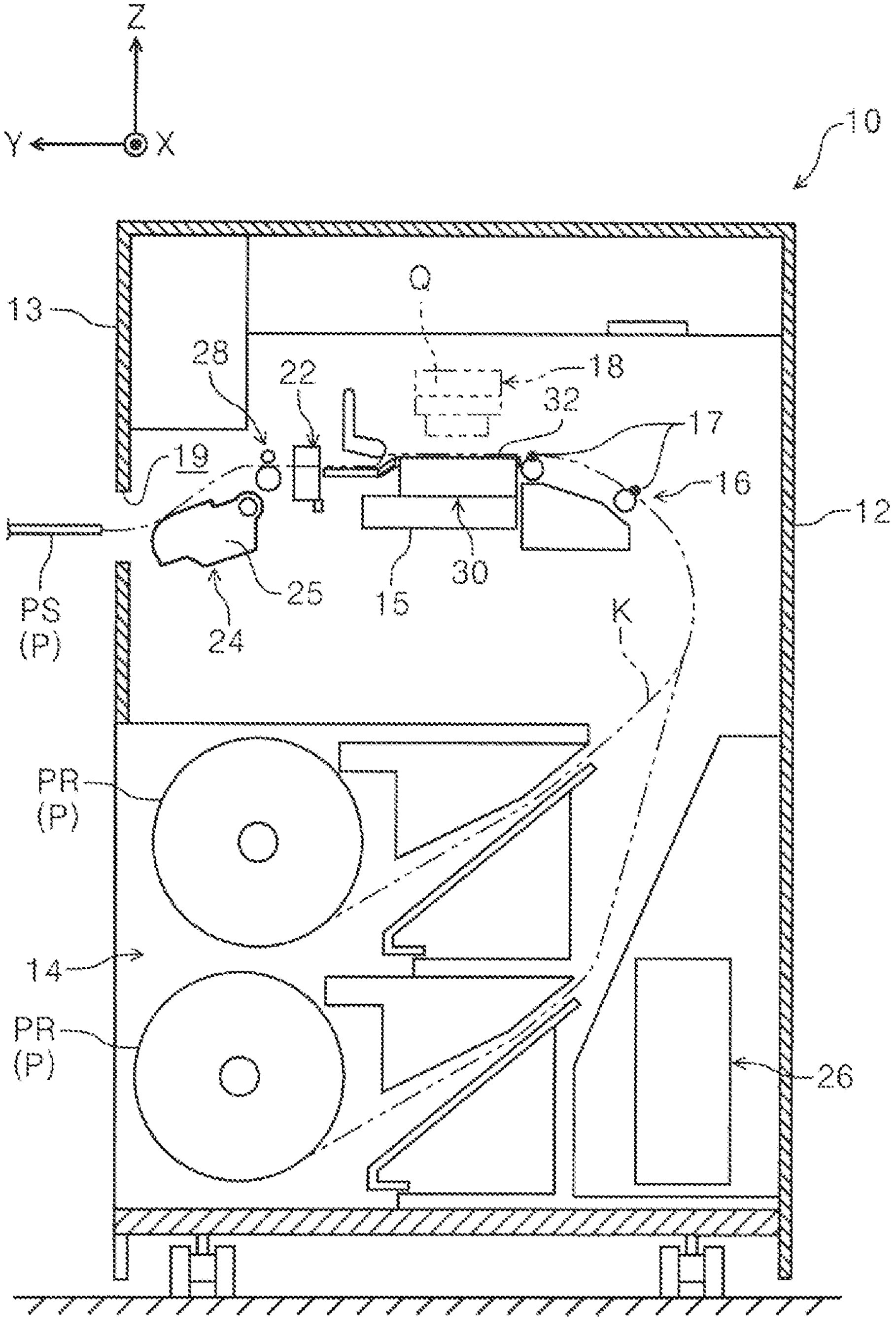
FIG. 1 is an overall configuration view of a printer according to an embodiment.

Hereinafter, a first aspect to a twelfth aspect of the present disclosure will be schematically described.

A recording device according to a first aspect includes: a recording unit configured to perform recording on a transported recording medium, an facing unit disposed facing the recording unit, the facing unit including a support surface configured to support the recording medium, a negative pressure chamber provided on an opposite side of the support surface from the recording unit, a plurality of suction ports provided in the support surface and configured to put the negative pressure chamber and an outside of the support surface in communication with each other, and a partition mechanism provided in the negative pressure chamber and configured to divide the negative pressure chamber by being rotated, and a driving unit provided separately from the facing unit and configured to drive the partition mechanism, wherein the partition mechanism includes a partition wall extending inside the negative pressure chamber and configured to be displaceable between an open position in which the partition wall is in an open state along a bottom surface of the negative pressure chamber and a closed position in which the partition wall is upright from the bottom surface in a closed state, an abutting unit coupled to the partition wall and extending outside of the negative pressure chamber, the abutting unit being configured to displace the partition wall, and a coupling unit disposed at a bottom of the negative pressure chamber and configured to couple the partition wall and the abutting unit, the coupling unit including a rotation center of the partition mechanism, the driving unit includes a driving source configured to rotate and a cam configured to rotate the abutting unit in conjunction with rotation of the driving source and thereby displace the partition wall between the open position and the closed position, and the coupling unit couples the partition wall and the abutting unit with a predetermined idle angle.

According to the present aspect, when there is a change in the positional relationship between the facing unit and the driving unit, there is a possibility that the contact state between the abutting unit and the driving unit will also change. Here, the coupling unit couples the partition wall and the abutting unit with a predetermined idle angle, which makes it possible to rotate the partition wall relative to the abutting unit. Thus, the partition wall can be disposed in the open position to sufficiently open the negative pressure chamber.

A recording device according to a second aspect is the recording device according to the first aspect, wherein the coupling unit includes a shaft rotatably supported on the bottom of the negative pressure chamber.

According to the present aspect, the shaft of the coupling unit is rotated while remaining at the bottom. As a result, compared to a configuration in which the coupling unit couples the partition wall and the abutting unit via an elastic member, the space required to maintain the coupled state between the partition wall and the abutting unit can be reduced.

A recording device according to a third aspect is the recording device according to the first aspect or the second aspect, including an imparting member configured to impart to the abutting unit force causing the abutting unit to rotate in a direction in which the partition wall is brought into the closed state.

According to the present aspect, even in a configuration in which it is difficult for the partition wall to reach the closed position due to assembly error or the like, since the imparting member imparts rotating force to the abutting unit, the partition wall is rotated to the closed position. Thus, the partition wall can be caused to reach the closed position.

A recording device according to a fourth aspect is the recording device according to the third aspect, wherein, when the partition wall is in the closed position, the imparting member imparts force to the abutting unit so that the abutting unit further rotates by the idle angle.

According to the present aspect, when the imparting member imparts force to the abutting unit, the abutting unit is not rotated by an excessive angle exceeding the idle angle. Thus, it is possible to suppress excessive load from acting on the abutting unit or the coupling unit.

A recording device according to a fifth aspect is the recording device according to any one of the first to fourth aspects, including a pressing member configured to press the partition wall in a direction in which the partition wall is brought into the open state.

According to the present aspect, even in a configuration in which it is difficult for the partition wall to reach the open position due to assembly error or the like, since the pressing member presses the partition wall, the partition wall is rotated to the open position. Thus, the partition wall can be caused to reach the open position.

A recording device according to a sixth aspect is the recording device according to the fifth aspect in which the third aspect is cited, or the recording device according to the fifth aspect in which the fourth aspect is cited, wherein the force imparted by the imparting member to the abutting unit is greater than the force with which the pressing member presses the partition wall.

According to the present aspect, force corresponding to the difference between the force imparted by the imparting member to the abutting unit and the force with which the pressing member presses the partition wall acts as force to rotate the partition wall by an amount corresponding to the idle angle. Thus, the partition wall can be caused to reach the closed position.

A recording device according to a seventh aspect is the recording device according to any one of the first to sixth aspects, wherein the cam is in contact with the abutting unit when the partition wall is in the open position, and the cam is not in contact with the abutting unit when the partition wall is in the closed position.

According to the present aspect, when the partition wall is in the closed position, the cam is not in contact with the abutting unit, so the abutting unit is suppressed from being excessively rotated. Thus, the partition wall can be suppressed from being disposed at a position excessively beyond the closed position.

A recording device according to an eighth aspect is the recording device according to any one of the first to seventh aspects, wherein the coupling unit is a rotating shaft that rotates around the rotation center.

According to the present aspect, compared to a configuration in which the coupling unit slides with the rotation center, the space required for movement of the coupling unit can be reduced.

A recording device according to a ninth aspect is the recording device according to any one of the first to eighth aspects, wherein a restricting portion configured to restrict displacement of the partition wall is provided at at least one of the open position and the closed position.

According to the present aspect, since the restricting portion restricts displacement of the partition wall, the partition wall can be suppressed from being positioned at a position excessively beyond the open position or the closed position.

A recording device according to a tenth aspect is the recording device according to any one of the first to ninth aspects, including: a frame to which the facing unit and the driving unit are attached, wherein the facing unit is provided so that a position of the facing unit is adjustable in a device height direction relative to the frame.

According to the present aspect, adjusting the position of the facing unit in a device height direction relative to the frame can adjust the spacing between the recording unit and the facing unit.

A recording device according to an eleventh aspect is the recording device according to any one of the first to tenth aspects, wherein the partition mechanism divides the negative pressure chamber in a width direction intersecting a transport direction of the recording medium.

According to the present aspect, when the size in the width direction of the recording medium is changed, the volume of the negative pressure chamber can be changed in accordance with the size in the width direction of the recording medium. Thus, the recording medium can be sucked in accordance with the size in the width direction of the recording medium.

A recording device according to an twelfth aspect is the recording device according to any one of the first to eleventh aspects, including: a suction unit configured to suck air in the negative pressure chamber, wherein a first amount of work of the suction unit when the negative pressure chamber is divided is less than a second amount of work of the suction unit when the negative pressure chamber is not divided.

According to the present aspect, when the negative pressure chamber is divided, the volume per one negative pressure chamber decreases. However, in keeping with the decrease in volume of the negative pressure chamber, the amount of work of the suction unit is reduced from the second amount of work to the first amount of work. Thus, excessive suction of the recording medium by the negative pressure chamber having a decreased volume can be suppressed.

Hereinafter, an example of a recording device according to the present disclosure will be described in detail.

In each of the drawings, the X direction along the X-axis is an example of a width direction of a printer 10 to be described later and a width direction of a recording medium. The −X direction is the left direction as viewed from the user when the front surface of the device is facing the user, while the +X direction is the right direction.

The Y direction along the Y-axis is an example of a device depth direction of the printer 10. The +Y direction is a direction from the back surface of the device toward the front surface, and is an example of a transport direction of paper P to be described later in a platen unit 30. The −Y direction is a direction from the front surface of the device toward the back surface. The X direction and Y direction are horizontal.

The Z direction along the Z-axis is the machine height direction of the printer 10 and the vertical direction. The +Z direction is vertically upward, while the −Z direction is vertically downward. The X direction, the Y direction, and the Z direction are mutually orthogonal. The paper P is an example of a recording medium. In the following description, the paper P is called differently: paper in a rolled state is called a roll paper PR, while paper in a cut sheet state is called a cut sheet PS.

In FIG. 1, the printer 10 is illustrated as an example of a recording device according to an embodiment.

In the +Y direction of the printer 10, there is provided a loading device (not illustrated) on which a cut sheet PS is loaded. The printer 10 has a cuboid-shaped housing 12. Furthermore, as an example, the printer 10 is configured as an ink-jet type printer capable of printing on paper P having a size from A4 size to A0 size. The printer 10 is also capable of recording on plain paper and photographic paper. Furthermore, the printer 10 is also capable of recording borderless images.

Figure 4:
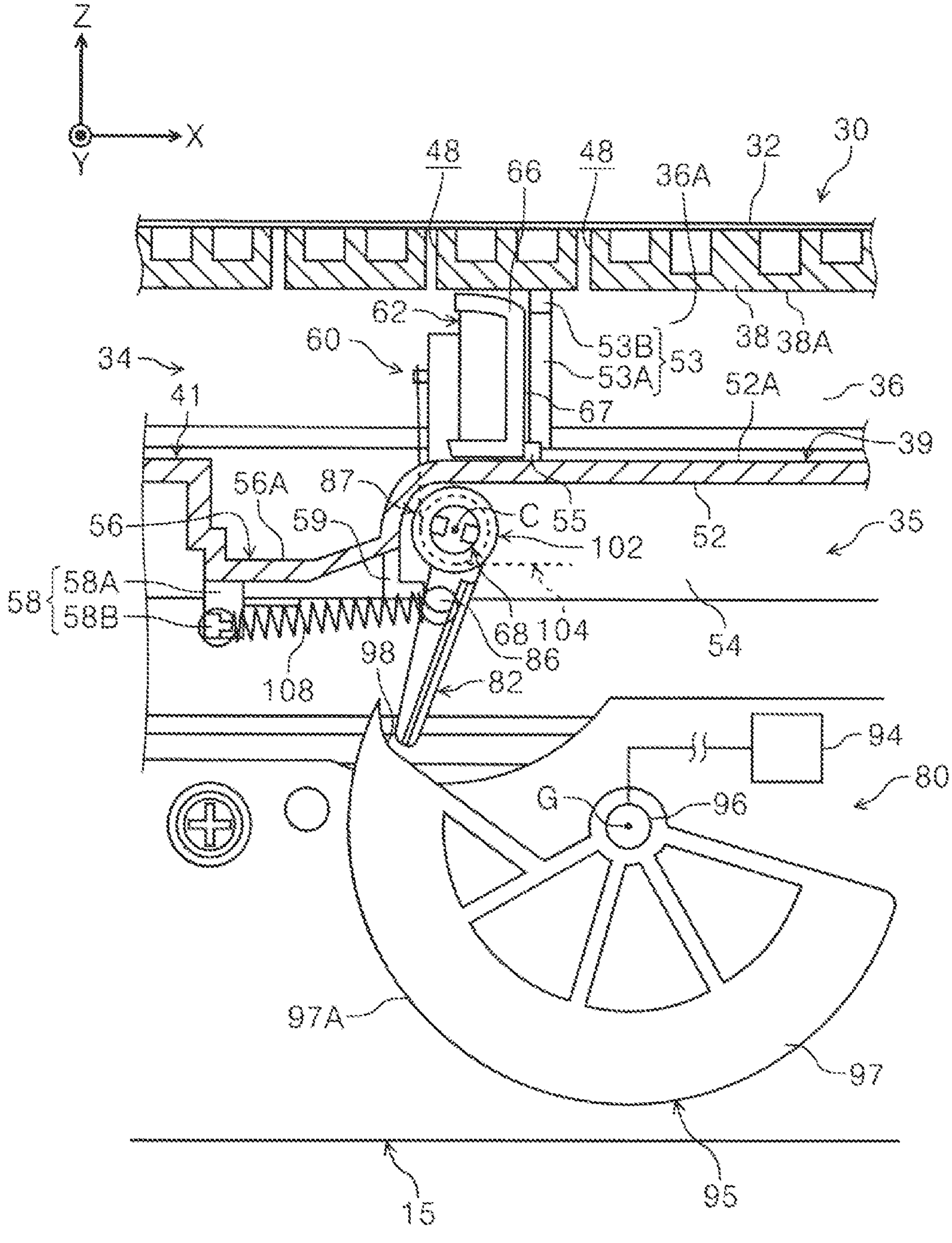
FIG. 4 is an enlarged longitudinal cross-sectional view of a portion of a platen in a state in which a shutter member of a printer according to an embodiment is raised.

Specifically, the printer 10 includes, inside the housing 12, a main body frame 15, a storage unit 14, a transport unit 16, a recording unit 18, a cutting unit 22, a discharge unit 24, a control unit 26, a platen unit 30, and a driving unit 80 (FIG. 4).

The housing 12 includes a sidewall 13 that constitutes a wall in the +Y direction of the housing 12. A discharge port 19 is formed penetrating the sidewall 13 in the Y direction.

The main body frame 15 is an example of a frame. The main body frame 15 is a member to which the platen unit 30 and the driving unit 80 to be described later are attached. Note that the platen unit 30 and the driving unit 80 are separately attached to the main body frame 15.

The storage unit 14 stores the roll paper PR rotated around a central axis along the X direction.

The transport unit 16 includes a plurality of transport roller pairs 17. Furthermore, the transport unit 16 transports the roll paper PR drawn from the storage unit 14 downstream along a transport path K indicated by a two-dot-dash line.

The recording unit 18 ejects ink Q as an example of droplets onto the roll paper PR transported in the +Y direction by the transport unit 16, thereby performing recording. Note that the roll paper PR is transported in the +Y direction in a region facing the recording unit 18. Furthermore, the recording unit 18 is positioned in the +Z direction relative to the roll paper PR. In other words, recording is performed on the upper surface in the +Z direction of the roll paper PR. Furthermore, as described above, the recording unit 18 is capable of recording on roll paper PR of a plurality of sizes having different widths in the X direction.

The cutting unit 22 cuts the roll paper PR on which recording was performed by the recording unit 18 in the X direction to form a cut sheet PS.

The discharge unit 24 includes a support 25 disposed downstream of the cutting unit 22 and a discharge roller pair 28. The support 25 supports the cut sheet PS and guides the cut sheet PS to the discharge port 19. The discharge roller pair 28 transports the cut sheet PS that was cut toward the support 25. The cut sheet PS discharged from the discharge port 19 is transported to a loading device (not illustrated).

The control unit 26 controls operation of each unit of the printer 10 including the operation of the recording unit 18 and the operation of the driving unit 80 to be described later.

Figure 2:
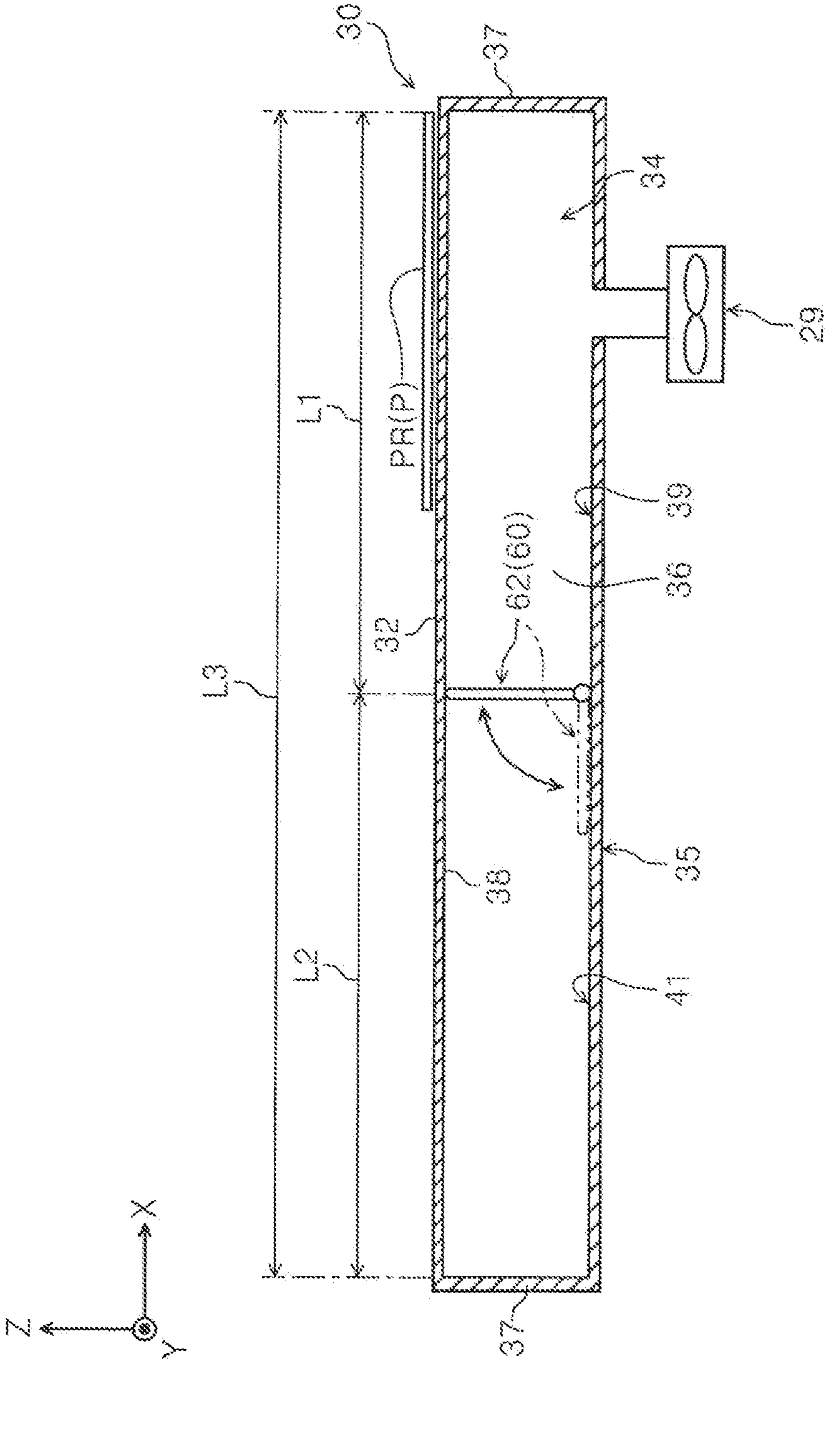
FIG. 2 is a longitudinal cross-sectional view schematically illustrating a platen of a printer according to an embodiment.

As illustrated in FIG. 2, the platen unit 30 is an example of an facing unit that faces the recording unit 18 (FIG. 1) and that is disposed in the −Z direction relative to the recording unit 18. The platen unit 30 is attached to the main body frame 15 (FIG. 1) using a bolt (not illustrated). An elongated hole (not illustrated) along the Z direction for adjusting height is formed in the main body frame 15. Here, moving the position of the bolt (not illustrated) in the Z direction relative to the elongated hole of the main body frame 15 makes it possible to adjust the position in the Z direction of the platen unit 30 relative to the main body frame 15.

The platen unit 30 includes, as an example, a support surface 32, a negative pressure chamber 34, a suction port unit 46 (FIG. 3), and a partition mechanism 60 (FIG. 4). Furthermore, at the platen unit 30, evacuation is performed by a suction fan 29.

The suction fan 29 is an example of a suction unit. The suction fan 29 sucks air in the negative pressure chamber 34. Furthermore, as an example, the suction fan 29 is only coupled to a first negative pressure chamber 39 to be described later.

The platen unit 30 is formed in a hollow rectangular cylindrical shape and extends in the X direction. The length in the X direction of the platen unit 30 is longer than the length in the X direction of the roll paper PR. Furthermore, when evacuated by the suction fan 29, the inside of the platen unit 30 turns into a negative pressure chamber 34.

The support surface 32 constitutes an end surface in the +Z direction of the platen unit 30. As an example, the support surface 32 is along the X-Y plane and supports the roll paper PR.

In the platen unit 30, the negative pressure chamber 34 is provided on the opposite side of the support surface 32 from the recording unit 18 (FIG. 1). As an example, the negative pressure chamber 34 is a hollow portion including a bottom 35, a front wall (not illustrated), a rear wall 36, two sidewalls 37, and a support wall 38. Furthermore, the negative pressure chamber 34 is divided into a first negative pressure chamber 39 and a second negative pressure chamber 41 by the partition mechanism 60 to be described later.

The support wall 38 is a wall that constitutes the ceiling of the negative pressure chamber 34. The support wall 38 is formed in a plate shape having a predetermined thickness in the Z direction. The support surface 32 is formed at the upper end in the +Z direction of the support wall 38.

As illustrated in FIG. 4, in a lower surface 38A inside of the support wall 38 and in an inner surface 36A inside of the front wall and the rear wall 36, a protrusion 53 is formed at a site at which division is performed by a shutter member 62 to be described later.

The protrusion 53 is formed in an L-shape, and includes a longitudinal portion 53A protruding in the Y direction from the inner surface 36A, and a horizontal portion 53B protruding in the −Z direction from the end in the Y direction of the lower surface 38A. Further, when the shutter member 62 is disposed in a closed position to be described later, the protrusion 53 covers a portion of the gap between the shutter member 62 and the inner surface 36A and between the shutter member 62 and the lower surface 38A as viewed from the +X direction to the −X direction. As a result, pressure loss can be suppressed from occurring in the negative pressure chamber 34.

Figure 3:
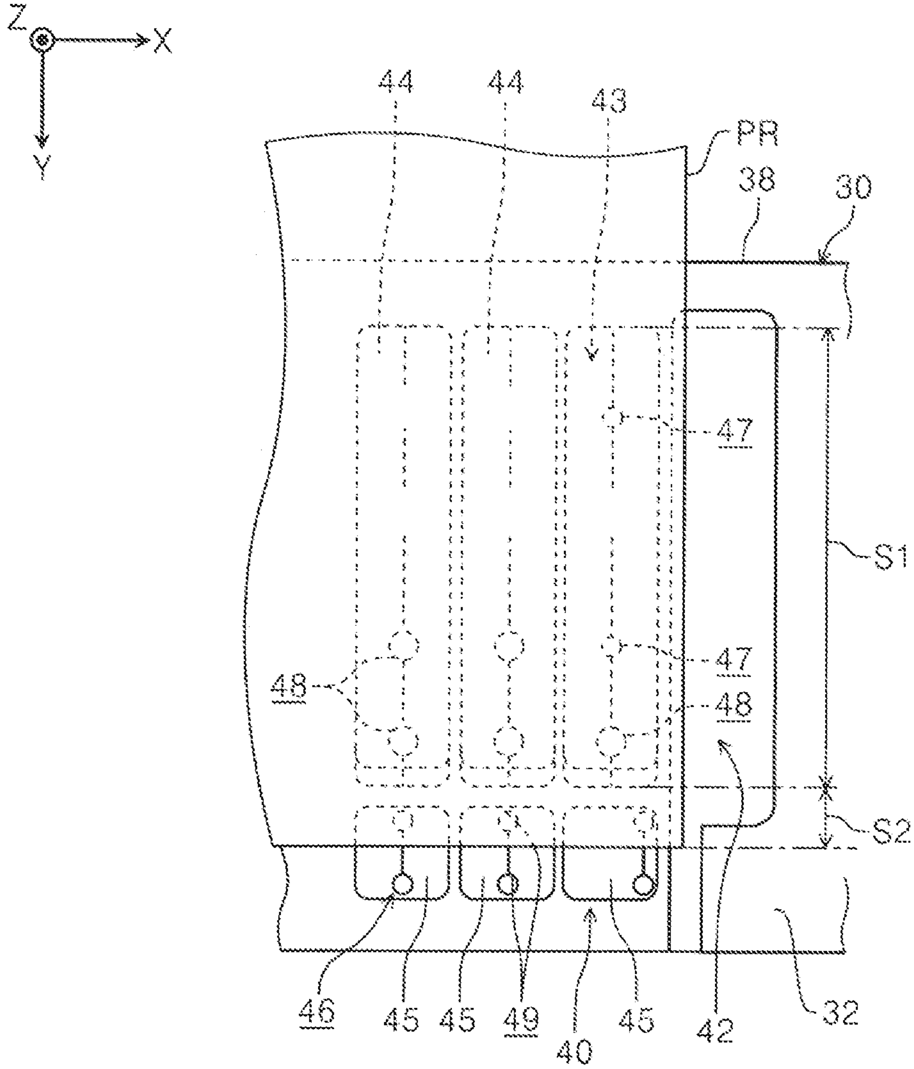
FIG. 3 is an enlarged plan view of a portion of a platen of a printer according to an embodiment.

As illustrated in FIG. 3, a dividing unit 40 and a recess 42 are formed in the support surface 32.

The dividing unit 40 includes a first compartment 43, second compartments 44, and third compartments 45, each recessed in the −Z direction from the support surface 32.

The first compartment 43 extends in the Y direction and faces, in the Z direction at the closest position, the end in the X direction of the roll paper PR. Two first suction ports 47 and one second suction port 48 are formed in the first compartment 43.

The second compartments 44 are disposed inward in the X direction of the first compartment 43 in the transport path K, and extend in the Y direction. The lengths in the Y direction of the second compartments 44 are approximately equal to the length in the Y direction of the first compartment 43. Two second suction ports 48 are formed in each second compartment 44.

The third compartments 45 are disposed in the +Y direction relative to the first compartment 43 and the second compartments 44. The lengths in the Y direction of the third compartments 45 are shorter than the lengths in the Y direction of the first compartment 43 and the second compartments 44. Two third suction ports 49 are formed in each third compartment 45.

The suction port unit 46 includes the first suction ports 47, the second suction ports 48, and the third suction ports 49. The first suction ports 47, the second suction ports 48, and the third suction ports 49 are examples of a plurality of suction ports, and are formed as through holes penetrating the support wall 38 in the Z direction. In this way, the first suction ports 47, the second suction ports 48, and the third suction ports 49 are provided in the support surface 32 and put the negative pressure chamber 34 (FIG. 2) and the outside of the support surface 32 in communication with each other.

As an example, a first suction port 47 and a third suction port 49 have approximately the same opening area. Furthermore, as an example, the opening area of a first suction port 47 and the opening area of a third suction port 49 are smaller than the opening area of a second suction port 48.

In the support surface 32, the recess 42 is provided outward in the X direction of the first compartment 43 in the transport path K. Furthermore, the recess 42 is a site that is recessed in the −Z direction from the support surface 32. The recess 42 is an example of a droplet receptacle that receives the ink Q when a borderless recording is performed on the roll paper PR.

In the platen unit 30, the recording area in the Y direction in which recording by the recording unit 18 (FIG. 1) is performed is S1. Furthermore, the margin region in the Y direction that is preset at the tip in the transport direction of the roll paper PR is S2.

Here, in the printer 10, of the two third suction ports 49 downstream of the recording region S1, when only the upstream third suction ports 49 are covered by the roll paper PR and face the margin region S2, the amount of leak increases, making it difficult to suck the tip of the roll paper PR. For this reason, in the printer 10, the operation of increasing the negative pressure is performed at the suction fan 29 (FIG. 2).

As illustrated in FIG. 2, a first amount of work W1 of the suction fan 29 when the negative pressure chamber 34 is divided into a first negative pressure chamber 39 and a second negative pressure chamber 41 is less than a second amount of work W2 of the suction fan 29 when the negative pressure chamber 34 is not divided. The amount of work of the suction fan 29 is determined by multiplying the static pressure by the amount of wind. Note that illustration of the first amount of work W1 and the second amount of work W2 is omitted.

As illustrated in FIG. 4, the bottom 35 includes, as an example, a bottom wall 52, a coupled portion 54, an accommodation portion 56, a hook 58, and a stopper 59.

The bottom wall 52 is disposed in the −Z direction relative to the support wall 38, and is formed in a plate shape having a predetermined thickness in the Z direction. In the bottom wall 52, a restricting portion 55 is formed at a site at which division is performed by the shutter member 62. In other words, the restricting portion 55 that restricts displacement in the +X direction of the shutter member 62 is provided at a closed position of the shutter member 62 on the bottom wall 52.

As an example, the restricting portion 55 protrudes in the +Z direction from both ends in the Y direction of a bottom surface 52A, which is the end surface in the +Z direction of the bottom wall 52. Furthermore, the restricting portion 55 is formed in a cuboid shape extending in the Y direction. When the shutter member 62 is in the closed position, the restricting portion 55 is positioned in the +X direction relative to the shutter member 62. As a result, the restricting portion 55 restricts the shutter member 62 from moving further in the +X direction from the closed position.

The coupled portion 54 is an example of a wall, and is a site having a sidewall protruding in the −Z direction from a portion of the bottom wall 52. Furthermore, the coupled portion 54 is integrated with the bottom wall 52.

The accommodation portion 56 is a site formed in a portion in the X direction of the bottom wall 52 and is recessed in the −Z direction. In other words, the accommodation portion 56 is a site that has a bottom surface 56A and is open in the +Z direction, and that is sized to be capable of accommodating therein a lid 66 to be described later of the shutter member 62. Note that the bottom surface 56A is an example of a restricting portion, and restricts displacement in the −Z direction of the shutter member 62 that is in the open position.

The hook 58 includes a longitudinal wall 58A extending in the −Z direction from the accommodation portion 56 and a protrusion 58B protruding in the +Y direction from an end in the −Z direction of the longitudinal wall 58A.

The stopper 59 is formed at the coupled portion 54. Furthermore, the stopper 59 is formed in an L-shape when viewed from the +Y direction to the −Y direction. The stopper 59 restricts rotation of a lever member 82 to be described later.

The partition mechanism 60 is provided in the negative pressure chamber 34. When rotated by the driving unit 80 to be described later, the partition mechanism 60 divides the negative pressure chamber 34 into the first negative pressure chamber 39 and the second negative pressure chamber 41. Specifically, the partition mechanism 60 divides the negative pressure chamber 34 in the X direction intersecting the +Y direction, which is the transport direction of the roll paper PR. As an example, the partition mechanism 60 includes the shutter member 62, the lever member 82, a coupling unit 102, a torsion spring 104, and a tensile spring 108. Note that the lever member 82, the coupling unit 102, and the tensile spring 108 are provided at both ends in the Y direction of the bottom 35.

The shutter member 62 is an example of a partition wall, and is a member that extends in the Y direction inside the negative pressure chamber 34. Furthermore, the shutter member 62 is provided so as to be displaceable between an open position in which the shutter member 62 is in an open state along the bottom surface 52A, and a closed position in which the shutter member is upright from the bottom surface 52A in a closed state.

Figure 5A:
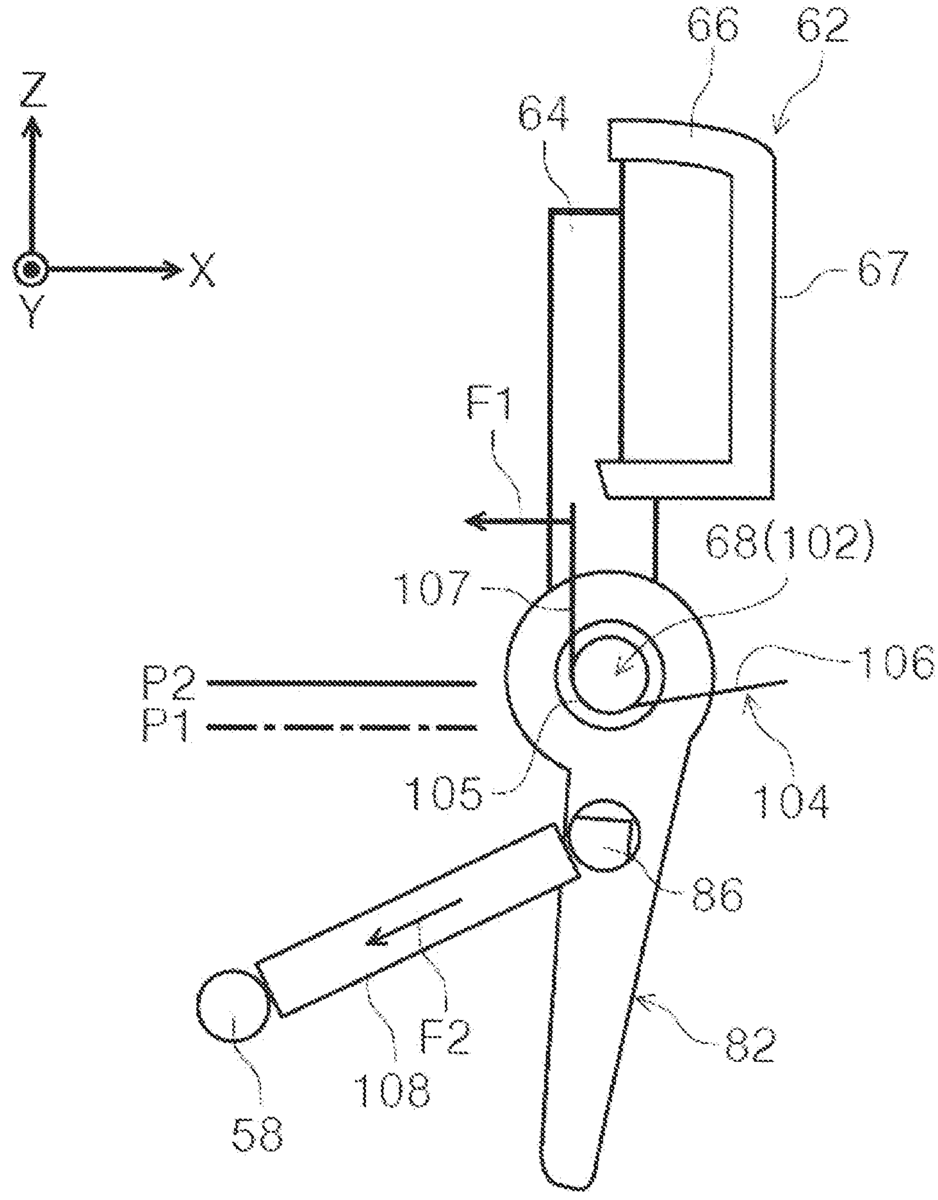
FIG. 5A is a side view illustrating a state in which a shutter member is in a closed position when the position of a platen of a printer according to an embodiment is higher than a reference position.
Figure 5B:
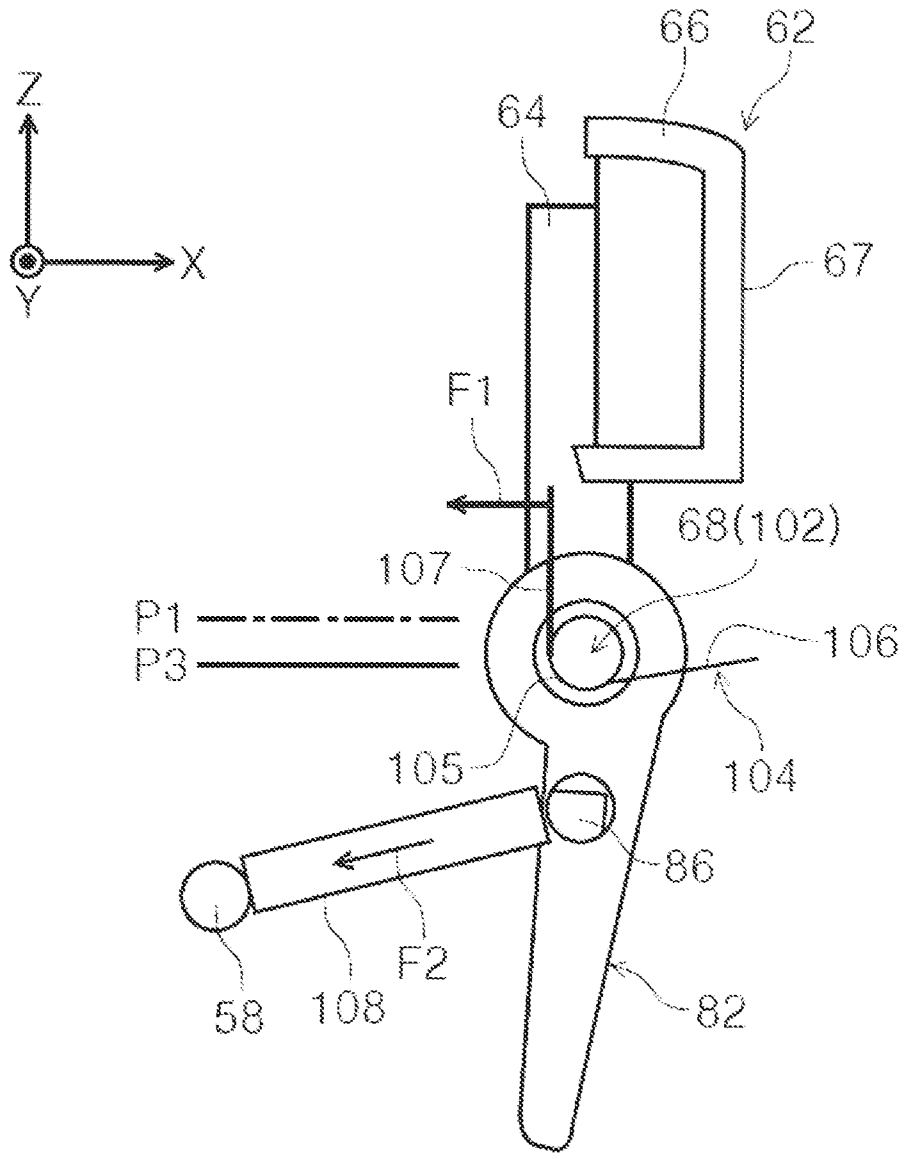
FIG. 5B is a side view illustrating a state in which a shutter member is in a closed position when the position of a platen of a printer according to an embodiment is lower than a reference position.

As illustrated in FIGS. 4, 5A, and 5B, the shutter member 62 includes a base 64 formed in a plate shape, the lid 66 protruding from a portion of the base 64, and a shaft 68 extending in the Y direction from a portion of the base 64 and coupled to the coupled portion 54.

An end of an arm 107 of the torsion spring 104 to be described later is attached to the central portion in the Y direction of the base 64. The base 64 is raised in the Z direction when the shutter member 62 is in the closed state. The shaft 68 also functions as a part of the coupling unit 102 to be described later. The shaft 68 will be described later in detail.

In FIGS. 5A and 5B, the torsion spring 104 is illustrated as being transmitted in the Y direction. Also illustrated in FIGS. 5A and 5B are a reference position P1 in the Z direction of the platen unit 30, a position P2 higher than the reference position P1 in the Z direction, and a position P3 lower than the reference position P1 in the Z direction.

As illustrated in FIG. 4, the lid 66 is a site that is sized to be capable of dividing the negative pressure chamber 34, and that extends in the Y direction. The lid 66 is accommodated in the accommodation portion 56. The lid 66 also includes a wall surface 67 disposed toward the first negative pressure chamber 39 when the shutter member 62 is displaced to the closed position.

The wall surface 67 is a flat surface as an example. Furthermore, the wall surface 67 is disposed along the Y-Z plane when the shutter member 62 is in the closed position. Furthermore, when the shutter member 62 is in the open position, the wall surface 67 is disposed along the X-Y plane, and the height position in the Z direction of the wall surface 67 is aligned approximately at the same height as that of the bottom surface 52A. In other words, when the shutter member 62 is in the open position, the bottom surface 52A and the wall surface 67 that constitute the bottom of the negative pressure chamber 34 are approximately in a flat state.

Figure 6:
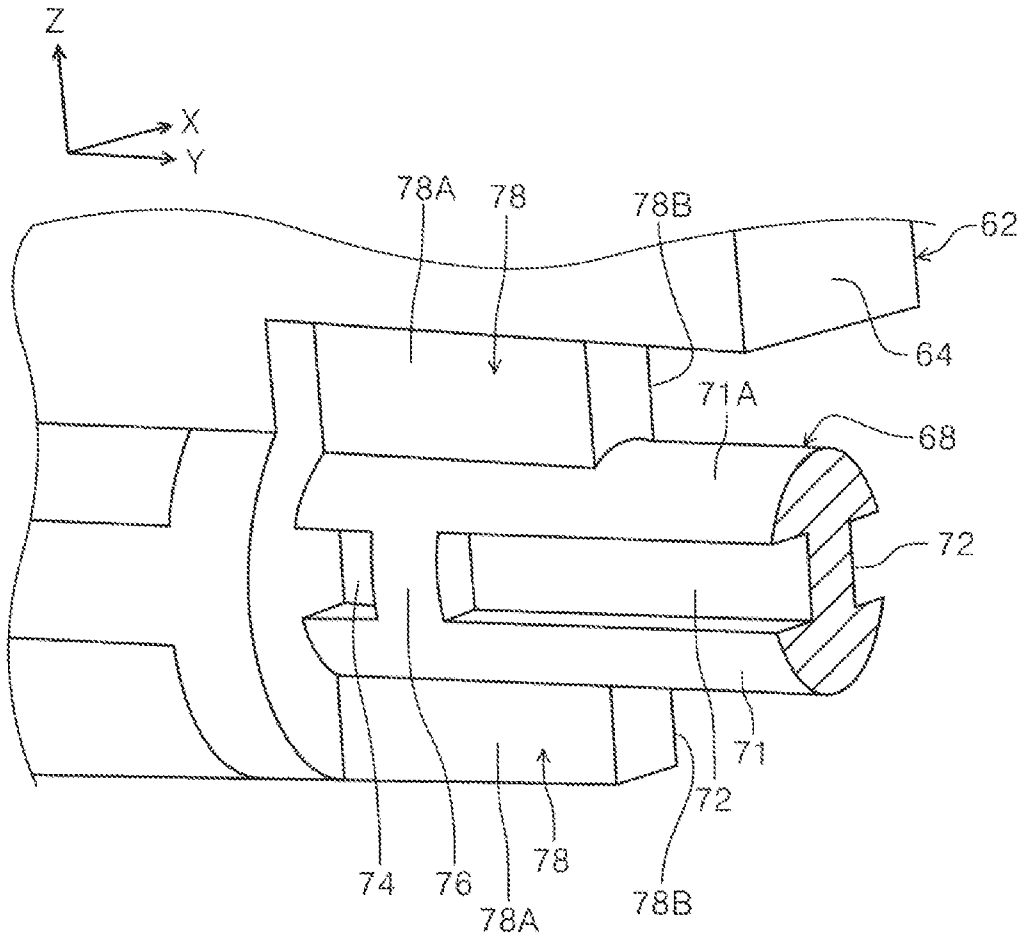
FIG. 6 is an enlarged perspective view of a shaft of a shutter member of a printer according to an embodiment and a peripheral portion of the shaft.

As illustrated in FIG. 6, when the shutter member 62 is in the closed state, the shaft 68 extends from both ends in the Y direction of the end in the −Z direction of the base 64 toward both outer sides in the Y direction. Note that in FIG. 6, the shaft 68 in the +Y direction is illustrated. The shaft 68 in the −Y direction has a similar configuration, so the illustration thereof is omitted.

The shaft 68 includes, as an example, a shaft main body 71, two recesses 72, two concavities 74, and two dividing portions 76. Note that only the concavity 74 and the dividing portion 76 in the −X direction are illustrated. Illustration of the concavity 74 and the dividing portion 76 in the +X direction is omitted. The shaft main body 71 is formed in a cylindrical shape with the Y direction as the axial direction. The shaft main body 71 has an outer circumferential surface 71A.

The two recesses 72 are formed in the outer circumferential surface 71A at two sites in the circumferential direction, of which the central angle is 180°. The two recesses 72 are each recessed radially inward.

The two concavities 74 are formed in the outer circumferential surface 71A on an inner side of the two recesses 72 in the Y direction. The two concavities 74 are each recessed radially inward.

The two dividing portions 76 are sites that divide the recesses 72 and the concavities 74 in the Y direction, respectively.

Two engaging portions 78 are formed each at a portion from the central portion in the Y direction of the outer circumferential surface 71A to an inner side end in the Y direction of the shaft 68.

The two engaging portions 78 are formed in a plate shape and jut radially outward of the shaft main body 71. Furthermore, in the circumferential direction of the shaft main body 71, the two engaging portions 78 are each in a position shifted by 90° relative to the two dividing portions 76. Furthermore, the lengths in the Y direction of the engaging portions 78 are longer than the lengths in the Y direction of the dividing portions 76.

In the circumferential direction of the outer circumferential surface 71A, one surface of each of the engaging portions 78 is a side surface 78A, and the other surface of each of the engaging portions 78 is a side surface 78B.

As illustrated in FIG. 4, the lever member 82 is an example of an abutting unit, and is coupled to the shutter member 62. Furthermore, the lever member 82 extends outside of the negative pressure chamber 34, and has a function of displacing the shutter member 62.

Figure 7:
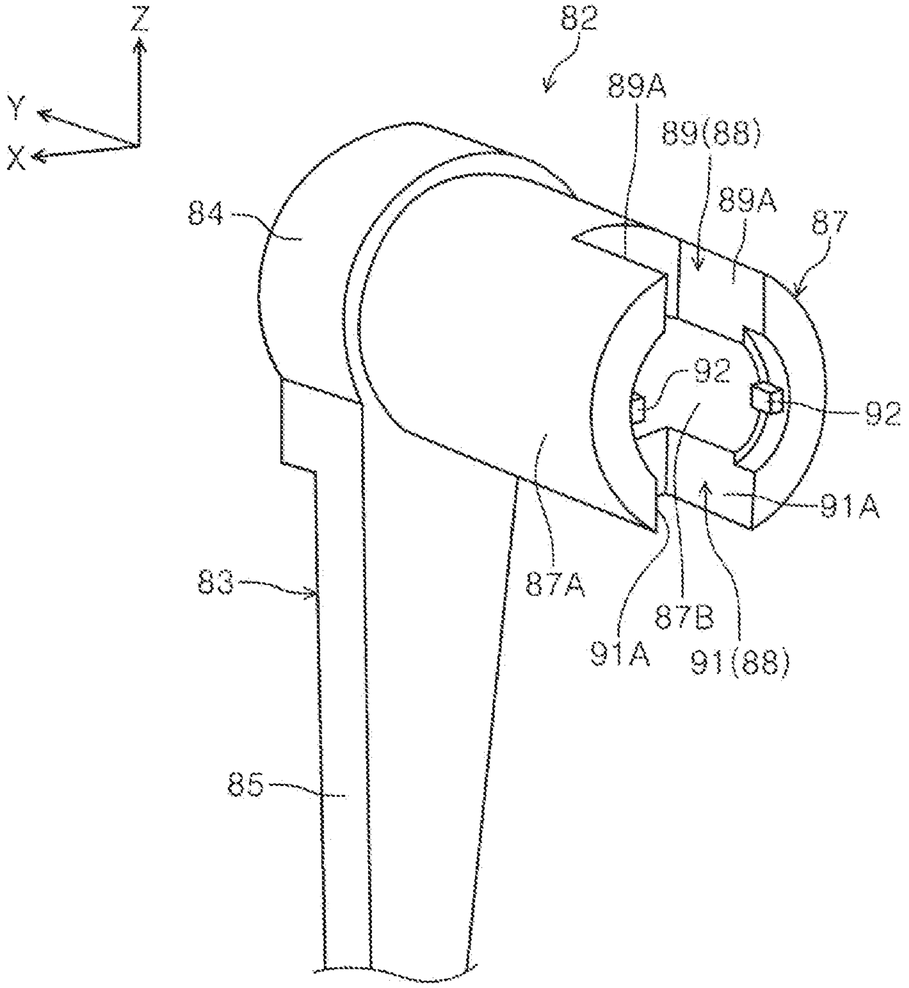
FIG. 7 is an enlarged perspective view of a cylinder of a lever member of a printer according to an embodiment and a peripheral portion of the cylinder.

As illustrated in FIG. 7, the lever member 82 includes a lever main body 83 and a cylinder 87.

The lever main body 83 includes a circular plate portion 84 having a predetermined thickness in the Y direction, an extended portion 85 extending in one direction outward from a portion of the outer circumference of the circular plate portion 84, and a hook 86 (FIG. 5A) protruding in the +Y direction from a portion of the extended portion 85. A through hole (not illustrated) is formed in the circular plate portion 84.

The cylinder 87 is formed in a cylindrical shape extending in the −Y direction from the circular plate portion 84. The cylinder 87 includes an outer circumferential surface 87A and an inner circumferential surface 87B. An end of the cylinder 87 on an opposite side of the circular plate portion 84 is inwardly notched in the Y direction to form an engaged portion 88.

The engaged portion 88 penetrates from the outer circumferential surface 87A to the inner circumferential surface 87B. Furthermore, the engaged portion 88 includes a first engaged portion 89 and a second engaged portion 91 that are disposed at an interval of 180° in the circumferential direction of the cylinder 87.

The first engaged portion 89 and the second engaged portion 91 are each formed in a U-shape that is open in the −Y direction when viewed in the radial direction of the cylinder 87.

The first engaged portion 89 includes two end surfaces 89A facing each other in the X direction.

The second engaged portion 91 includes two end surfaces 91A facing each other in the X direction.

The first engaged portion 89 and the second engaged portion 91 are sized so that the engaging portions 78 (FIG. 6) are capable of being inserted into engagement therewith, respectively.

Two projections 92 protruding radially inward from the inner circumferential surface 87B are provided at the end in the −Y direction of the inner circumferential surface 87B. The two projections 92 are disposed shifted by 180° in the circumferential direction of the cylinder 87, and are radially opposed. The two projections 92 are inserted one by one into the two concavities 74 (FIG. 6) of the shaft 68.

As illustrated in FIG. 4, the coupling unit 102 is disposed at the bottom 35 of the negative pressure chamber 34, and a portion of the coupling unit 102 is coupled to the coupled portion 54. The coupling unit 102 is rotatable around a central axis along the Y direction. Furthermore, the coupling unit 102 couples the shutter member 62 and the lever member 82, and includes a rotation center C of the partition mechanism 60.

In the present embodiment, the coupling unit 102 includes the shaft 68 and the cylinder 87. In other words, the coupling unit 102 is integrally formed with a portion of the shutter member 62 and a portion of the lever member 82. Note that the coupling unit 102 may be provided as a separate part from the shutter member 62 and the lever member 82. In this way, the coupling unit 102 includes the shaft 68 rotatably supported on the bottom 35 of the negative pressure chamber 34. Furthermore, the coupling unit 102 is a rotating shaft that rotates around the rotation center C.

Figure 8:
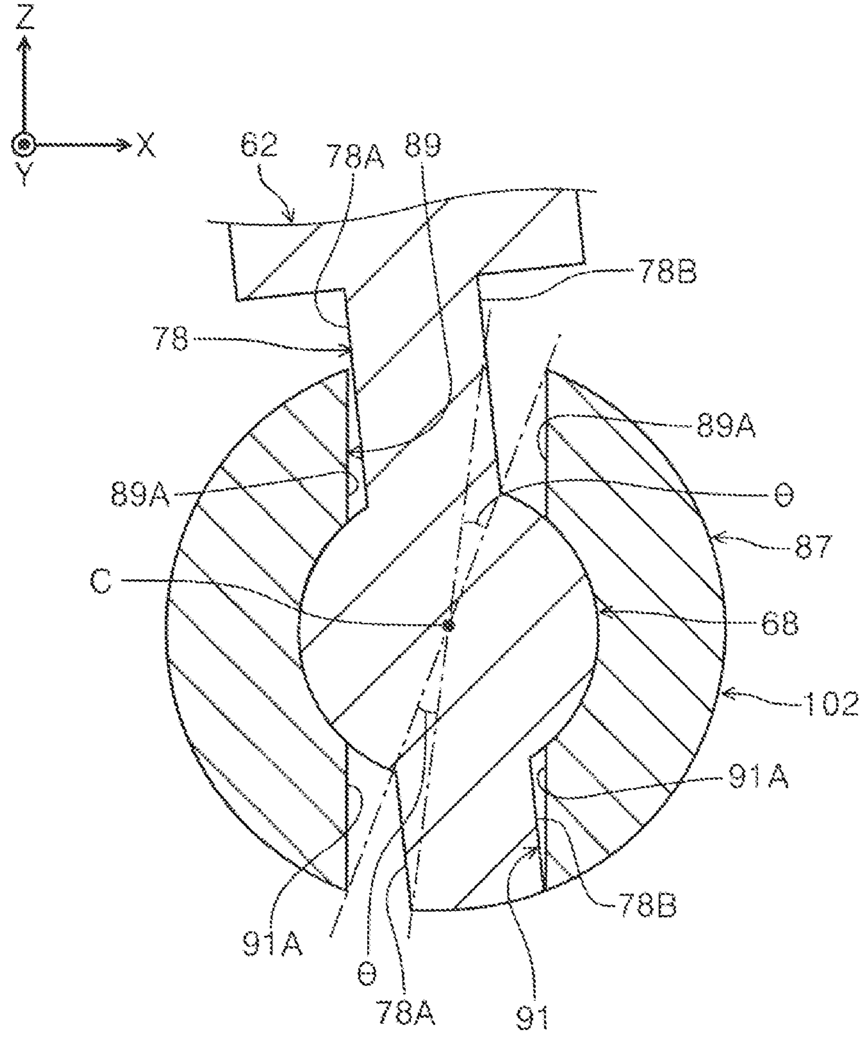
FIG. 8 is a longitudinal cross-sectional view illustrating a idle angle at an engagement portion between a shutter member and a lever member of a printer according to an embodiment.

As illustrated in FIGS. 6, 7, and 8, the shaft 68 is engageable with the cylinder 87. Specifically, the shaft 68 is inserted into the cylinder 87, and the two projections 92 are inserted into the two concavities 74. The two projections 92 are retained in the Y direction by the two dividing portions 76. Since the engaging portions 78 are engaged with the first engaged portion 89 and the second engaged portion 91, rotation of the lever member 82 relative to the shutter member 62 is stopped. Note that in the present embodiment, engagement is a concept that also encompasses a mere contact between two members.

In the circumferential direction of the cylinder 87, the widths of the engaging portions 78 are narrower than the spacing between the two end surfaces 89A, and narrower than the spacing between the two end surfaces 91A. As a result, as an example, there exists a idle angle θ (°), represented by the central angle about the rotation center C, between the side surface 78A and the end surface 91A, and between the side surface 78B and the end surface 89A. In other words, the coupling unit 102 couples the shutter member 62 and the lever member 82 with a predetermined idle angle θ.

As illustrated in FIG. 4, the driving unit 80 is provided separately from the platen unit 30. Furthermore, the driving unit 80 is attached to the main body frame 15, and drives the partition mechanism 60. The driving unit 80 includes a motor 94 as an example of a driving source for performing rotation, and a cam 95 configured to rotate the lever member 82 in conjunction with the rotation of the motor 94 and thereby displace the shutter member 62 between an open position and a closed position.

The operation of the motor 94 is controlled by the control unit 26 (FIG. 1). The driving force of the motor 94 is transmitted to the cam 95 via a transmission gear (not illustrated).

The cam 95 includes a cylindrical rotating shaft 96 extending along the Y direction, and a cam main body 97 formed approximately in a semi-circular shape centered on the rotating shaft 96 as viewed in the Y direction.

The rotating shaft 96 is rotatably supported on a portion of the main body frame 15. Note that the center of rotation of the rotating shaft 96 is a center G.

The cam main body 97 includes a cam surface 97A that is an outer circumferential surface. In the cam main body 97, a site that is radially inward of the cam surface 97A and that is positioned at one end in the circumferential direction is notched in the circumferential direction. This notched site is a retracting portion 98.

The site of the retracting portion 98 that is adjacent to the cam surface 97A is notched in a curved surface shape.

When the shutter member 62 is in the closed position, since the retraction portion 98 is formed, the tip of the lever member 82 is in a non-contact state with the cam 95.

When the cam 95 is in non-contact with the lever member 82 and the shutter member 62 is in the closed position, the cam 95 is rotated about the center G in a clockwise direction when viewed from the +Y direction to the −Y direction. This causes the cam 95 to come into contact with the lever member 82 and rotate the lever member 82 in a counter-clockwise direction. As a result, the shutter member 62 is moved from the closed position toward the open position.

Furthermore, when the lever member 82 and the cam surface 97A are in contact with each other and the shutter member 62 is in the open position (the state illustrated in FIG. 9), the cam 95 is further rotated about the center G in the clockwise direction to be separated from the lever member 82. As a result, the lever member 82 is rotated in the clockwise direction, and the shutter member 62 is moved from the open position toward the closed position.

In this way, the cam 95 is in contact with the lever member 82 when the shutter member 62 is in the open position, and is not in contact with the lever member 82 when the shutter member 62 is in the closed position.

As illustrated in FIG. 4, since the control unit 26 (FIG. 1) controls rotation, the shutter member 62 switches between an open position in which the lid 66 is accommodated in the accommodation portion 56, and a closed position in which the lid 66 is upright along the +Z direction and divides the negative pressure chamber 34 into the first negative pressure chamber 39 and the second negative pressure chamber 41.

As illustrated in FIG. 2, when the length corresponding to the width in the X direction of the roll paper PR is less than or equal to a length L1 corresponding to the width in the X direction of the first negative pressure chamber 39, the shutter member 62 is rotated to the closed position, thereby dividing the negative pressure chamber 34 into the first negative pressure chamber 39 and the second negative pressure chamber 41. Furthermore, when the length corresponding to the width in the X direction of the roll paper PR is greater than the length L1, the shutter member 62 is rotated to the open position, thereby releasing the division between the first negative pressure chamber 39 and the second negative pressure chamber 41.

Note that FIG. 2 illustrates the length L1, a length L2 corresponding to the width in the X direction of the second negative pressure chamber 41, and a length L3 corresponding to the width in the X direction of the negative pressure chamber 34.

$$L3=L1+L2$$

As illustrated in FIG. 5A, the torsion spring 104 includes a winding portion 105, an arm 106 extending to one side from the winding portion 105, and an arm 107 extending to the other side from the winding portion 105. Furthermore, the torsion spring 104 is positioned at the central portion in the Y direction of the shutter member 62.

The winding portion 105 is disposed so that the central axis is along the Y direction. Furthermore, the winding portion 105 is supported on a portion of the bottom 35 (FIG. 4). The end of the arm 106 is engaged with a portion of the bottom 35. The end of the arm 107 is engaged with the end in the −X direction of the base 64.

As an example, the torsion spring 104 is a torsion spring of which the arm 106 and the arm 107 are disposed approximately 180° apart in a natural state in which no external force acts thereon. For this reason, when the shutter member 62 is moved toward the closed position, the torsion spring 104 presses the shutter member 62 in a direction in which the shutter member 62 is brought into the open state. That is, the torsion spring 104 is an example of a pressing member.

Note that when the shutter member 62 is in the open state, the torsion spring 104 causes force F1 (FIGS. 10A and 10B) in the −Z direction to act and press the shutter member 62 in the gravitational direction. In other words, the torsion spring 104 acts so as to reliably put the shutter member 62 that is in the open position into the accommodation portion 56.

Furthermore, even when the shutter member 62 is in the closed state, the torsion spring 104 causes the force F1 (FIGS. 5A and 5B) toward the accommodation portion 56 to act on the shutter member 62.

With one end hooked to the hook 86 of the lever member 82 and the other end hooked to the hook 58 of the bottom 35, the tensile spring 108 imparts force to the lever member 82. That is, the tensile spring 108 is an example of an imparting member, and imparts to the lever member 82 force F2 (FIGS. 5A and 5B) causing the lever member 82 to rotate in the direction in which the shutter member 62 is brought into the closed state.

Since the tensile spring 108 imparts force to the lever member 82, when the shutter member 62 is rotated to the closed position and in a state of abutting the restricting portion 55, the lever member 82 further rotates by the idle angle θ (FIG. 8). As a result, in the closed state, the shutter member pressed in the F1 direction can be reliably moved to the closed position.

The force F2 imparted by the tensile spring 108 to the lever member 82 is greater than the force with which the torsion spring 104 presses the shutter member 62.

Next, the action of the printer 10 according to an embodiment will be described. Note that, for each configuration of the printer 10, reference is to be made to FIGS. 1 to 8. Thus, individual drawing numbers are omitted from description.

Figure 9:
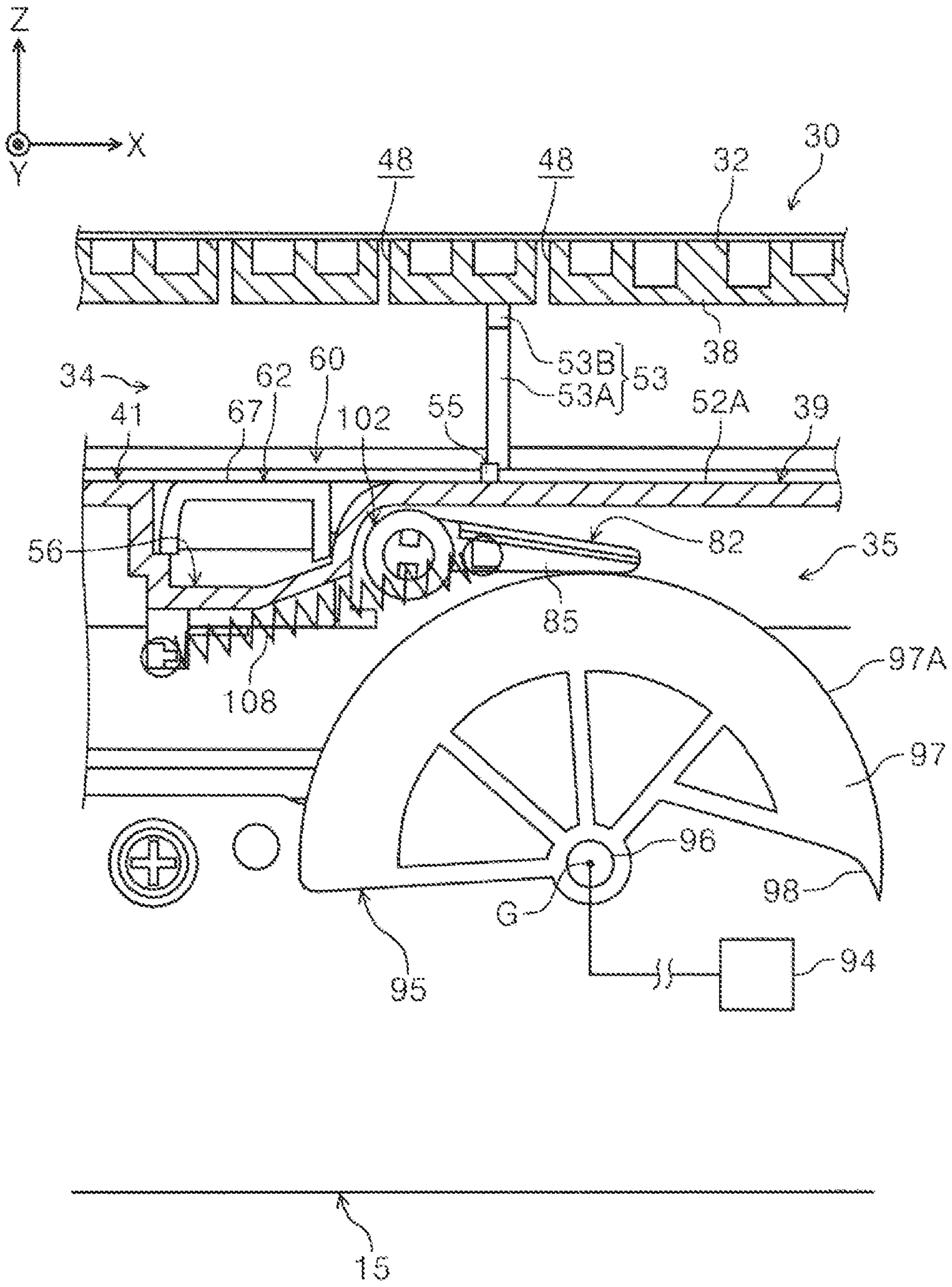
FIG. 9 is an enlarged longitudinal cross-sectional view of a portion of a platen in a state in which a shutter member of a printer according to an embodiment is accommodated.

As illustrated in FIG. 9, with the extended portion 85 pushed up in the +Z direction by the cam 95, the lever member 82 is tilted down while resisting the tensile force of the tensile spring 108. As a result, the shutter member 62 is brought to the open state in which the shutter member 62 is accommodated in the accommodation portion 56, putting the first negative pressure chamber 39 and the second negative pressure chamber 41 in communication with each other to form the negative pressure chamber 34.

Furthermore, the wall surface 67 and the bottom surface 52A are aligned approximately at the same height in the Z direction. As a result, the surface corresponding to the bottom surface of the negative pressure chamber 34 is in a flat state.

Figure 10A:
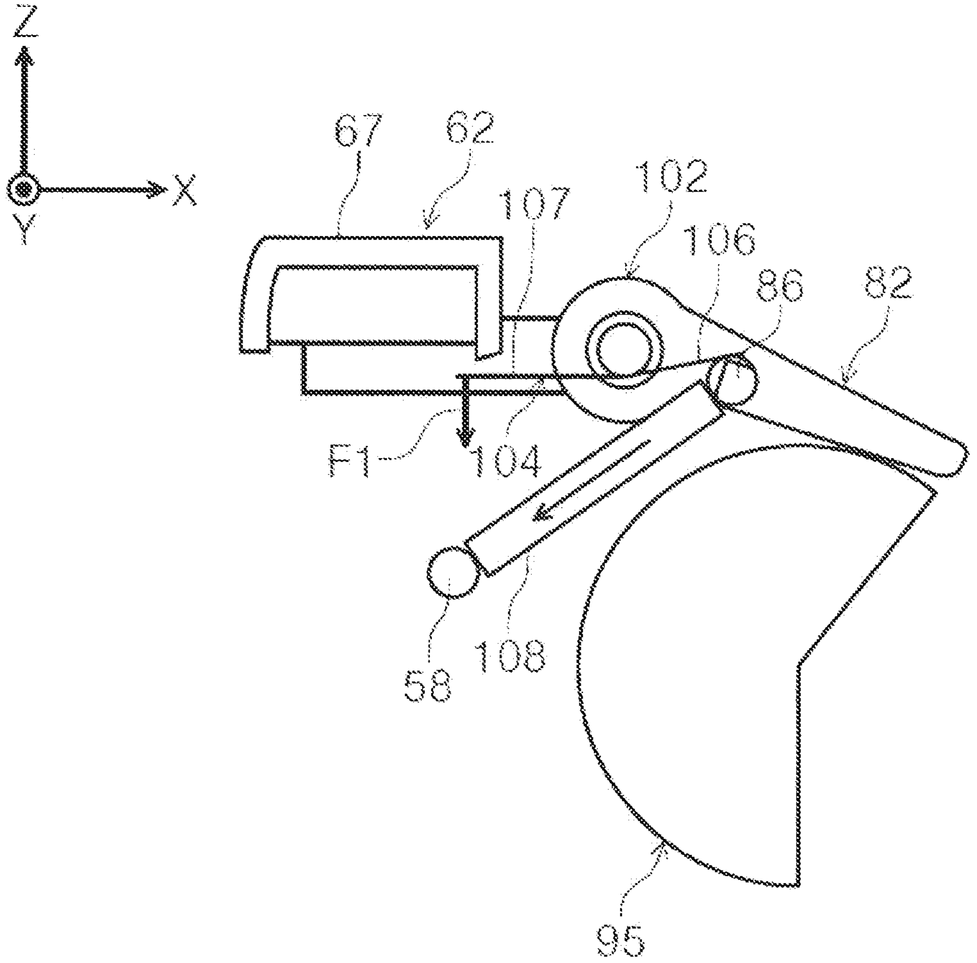
FIG. 10A is a side view illustrating a state in which a shutter member is in an open position when the position of a platen of a printer according to an embodiment is higher than a reference position.

As illustrated in FIG. 10A, in a case in which the shutter member 62 is in the open state, when the platen unit 30 is adjusted in height to a position P2 (FIG. 5A), the spacing in the Z direction between the cam 95 and the shutter member 62 is widened. Here, the shutter member 62 is capable of rotating relative to the lever member 82 within the range of the idle angle θ. Thus, the shutter member 62 is pressed in the F1 direction by the force of the torsion spring 104. As a result, the shutter member 62 is reliably accommodated in the accommodation portion 56, and the wall surface 67 and the bottom surface 52A are aligned approximately at the same height in the Z direction.

Figure 10B:
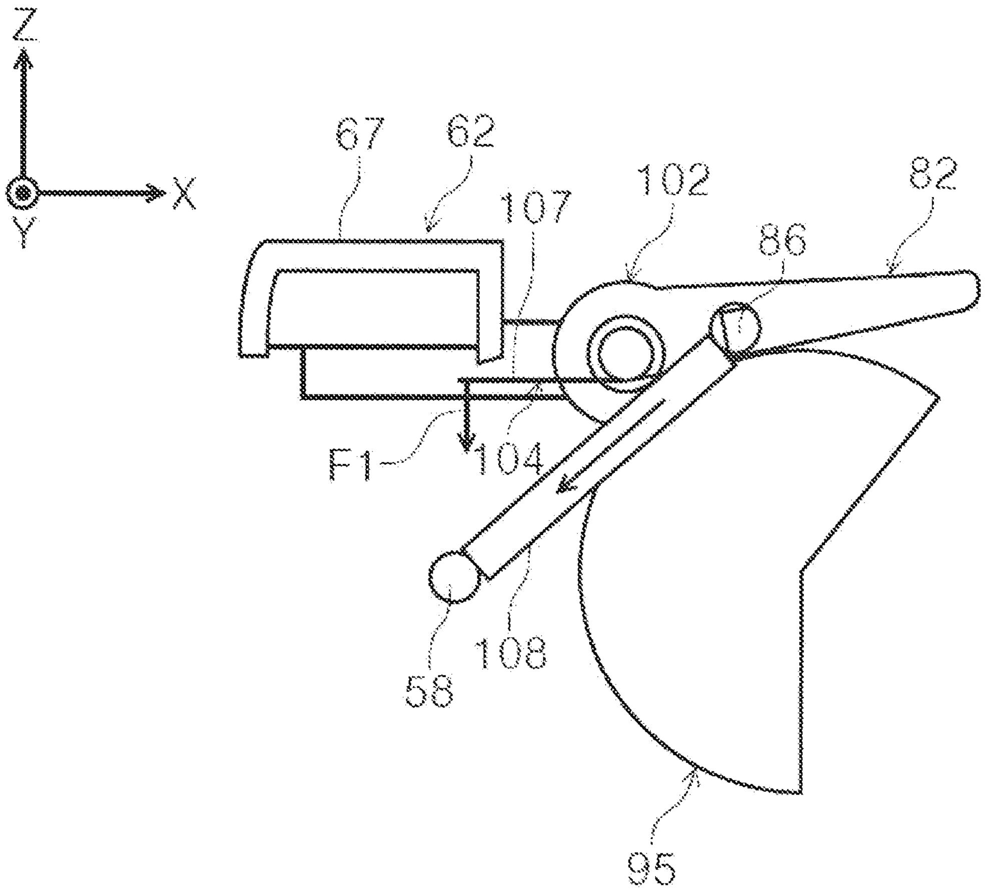
FIG. 10B is a side view illustrating a state in which a shutter member is in an open position when the position of a platen of a printer according to an embodiment is lower than a reference position.

As illustrated in FIG. 10B, in a case in which the shutter member 62 is in the open state, when the platen unit 30 is adjusted in height to a position P3 (FIG. 5B), the spacing in the Z direction between the cam 95 and the shutter member 62 is narrowed. Here, the lever member 82 is capable of rotating relative to the shutter member 62 within the range of the idle angle θ. Thus, even when the shutter member 62 comes into contact with the bottom surface 56A and the cam 95 pushes up the lever member 82 in the +Z direction more than necessary, it is possible, without affecting the shutter member 62, to prevent the shutter member 62 and the lever member 82 from being damaged.

As illustrated in FIG. 4, when the cam 95 is rotated and the extension 85 is separated from the cam 95, the lever member 82 is rotated by the tensile force of the tensile spring 10. Note that the tensile force of the tensile spring 108 is greater than the force with which the torsion spring 104 tries to move the shutter member 62 to the open position. As a result, the shutter member 62 is brought to the closed state in which the shutter member 62 is raised in the Z direction to divide the first negative pressure chamber 39 and the second negative pressure chamber 41.

When the raised shutter member 62 is in contact with the restricting portion 55, excessive rotation in the +X direction is restricted.

As illustrated in FIGS. 4, 5A, and 5B, when the shutter member 62 is in the closed state, the cam 95 and the lever member 82 are separated. For this reason, even when the platen unit 30 is adjusted in height to the position P2 or the position P3, it is difficult for the lever member 82 to be rotated by the cam 95, making it possible to maintain the shutter member 62 in the closed state.

As described above, according to the printer 10, when there is a change in the positional relationship between the platen unit 30 and the driving unit 80, there is a possibility that the contact state between the lever member 82 and the driving unit 80 will also change. Here, the coupling unit 102 couples the shutter member 62 and the lever member 82 with a predetermined idle angle θ, which makes it possible to rotate the shutter member 62 relative to the lever member

82. Thus, the shutter member 62 can be disposed at the open position to sufficiently open the negative pressure chamber 34.

According to the printer 10, the shaft 68 of the coupling unit 102 is rotated while remaining in the bottom 35. As a result, compared to a configuration in which the coupling unit 102 couples the shutter member 62 and the lever member 82 via an elastic member, the space required to maintain the coupled state between the shutter member 62 and the lever member 82 can be reduced.

According to the printer 10, even in a configuration in which it is difficult for the shutter member 62 to reach the closed position due to assembly error or the like, since the tensile spring 108 imparts rotating force to the lever member 82, the shutter member 62 is rotated to the closed position. Thus, the shutter member 62 can be caused to reach the closed position.

According to the printer 10, when the tensile spring 108 imparts force to the lever member 82, the lever member 82 is not rotated by an excessive angle exceeding the idle angle θ. Thus, it is possible to suppress excessive load from acting on the lever member 82 or the coupling unit 102.

According to the printer 10, even in a configuration in which it is difficult for the shutter member 62 to reach the open position due to assembly error or the like, since the torsion spring 104 presses the shutter member 62, the shutter member 62 is rotated to the open position. Thus, the shutter member 62 can be caused to reach the closed position.

According to the printer 10, force corresponding to the difference between the force that the tensile spring 108 imparts to the lever member 82 and the force with which the torsion spring 104 presses the shutter member 62 acts as force causing the shutter member 62 to rotate by the idle angle θ. Thus, the shutter member 62 can be caused to reach the closed position.

According to the printer 10, when the shutter member 62 is in the closed position, the cam 95 is not in contact with the lever member 82, so the lever member 82 is suppressed from being excessively rotated. Thus, the shutter member 62 can be suppressed from being disposed at a position excessively beyond the closed position.

According to the printer 10, compared to a configuration in which the coupling unit 102 slides with the rotation center C, the space required for movement of the coupling unit 102 can be reduced.

According to the printer 10, since the restricting portion 55 or the bottom surface 56A restricts displacement of the shutter member 62, the shutter member 62 can be suppressed from being positioned at a position excessively beyond the open position or the closed position.

According to the printer 10, adjusting the position in the Z direction of the platen unit 30 relative to the main body frame 15 can adjust the spacing in the Z direction between the recording unit 18 and the platen unit 30.

According to the printer 10, when the size in the X direction of the paper P is changed, driving the shutter member 62 can change the volume of the negative pressure chamber 34 in accordance with the size in the X direction of the paper P. Thus, the paper P can be sucked in accordance with the size in the X direction of the paper P.

According to the printer 10, when the negative pressure chamber 34 is divided by the shutter member 62, the volume per one negative pressure chamber 34 decreases. However, in keeping with the decrease in volume of the negative pressure chamber 34, the amount of work of the suction fan 29 is reduced from the second amount of work W2 to the first amount of work W1. Thus, excessive suction of the paper P in the negative pressure chamber 34 having a decreased volume can be suppressed.

The printer 10 according to the embodiments of the present disclosure basically has the configurations described above. However, it goes without saying that partial configuration modifications, omissions, and other changes may be made without departing from the spirit and scope of the disclosure of the present application.

In the printer 10, the coupling unit 102 may be provided so as to be displaceable relative to the coupled portion 54. Furthermore, the coupling unit 102 may be constituted by an elastic member that does not have the rotation center C.

When the cam 95 is coupled to the lever member 82, the tensile spring 108 does not have to be provided. The tensile spring 108 does not have to impart force to the lever member 82 so that the lever member 82 further rotates by the idle angle θ. Instead of providing the torsion spring 104, a weight may be provided at a portion of the shutter member 62 to cause the shutter member 62 to rotate to the open position by its own weight.

In the printer 10, the force imparted by the tensile spring 108 to the lever member 82 may be equal to the force with which the torsion spring 104 presses the shutter member 62. When the shutter member 62 is in the open position, the cam 95 may be in contact with the lever member 82.

The restricting portion that restricts displacement of the shutter member 62 may be provided only at the open position or only at the closed position. The position of the platen unit 30 may be adjustable in the Z direction relative to a member other than the main body frame 15.

In the printer 10, the partition mechanism 60 may divide the negative pressure chamber 34 in the transport direction of the paper P. Furthermore, the negative pressure chamber 34 may be divided into three or more. In other words, two or more partition mechanisms 60 may be provided. As for the suction fan 29, the first amount of work W1 when the negative pressure chamber 34 is divided may be equal to the second amount of work W2 when the negative pressure chamber 34 is not divided. The recording unit 18 may either be a serial recording head or a line head.

What is claimed is:

1. A recording device comprising:

a recording unit configured to perform recording on a transported recording medium;

a facing unit disposed facing the recording unit, the facing unit including a support surface configured to support the recording medium, a negative pressure chamber provided on an opposite side of the support surface from the recording unit, a plurality of suction ports provided in the support surface and configured to put the negative pressure chamber and an outside of the support surface in communication with each other, and a partition mechanism provided in the negative pressure chamber and configured to divide the negative pressure chamber by being rotated; and a driving unit provided separately from the facing unit and configured to drive the partition mechanism; wherein the partition mechanism includes a partition wall extending inside the negative pressure chamber and configured to be displaceable between an open position in which the partition wall is horizontally positioned with respect to a bottom surface of the negative pressure chamber and a closed position in which the partition wall is vertically positioned with respect to the bottom surface, an abutting unit coupled to the partition wall and extending outside of the negative pressure chamber, the abutting unit being configured to displace the partition wall, and a coupling unit disposed at a bottom of the negative pressure chamber and configured to couple the partition wall and the abutting unit, the coupling unit including a rotation center of the partition mechanism, the driving unit includes a driving source configured to rotate and a cam configured to rotate the abutting unit in conjunction with rotation of the driving source and thereby displace the partition wall between the open position and the closed position, the coupling unit couples the partition wall and the abutting unit with a predetermined idle angle, and in an open state, a horizontal surface of the partition wall is aligned at the same height with the bottom surface of the negative pressure chamber.

2. The recording device according to claim 1, wherein the coupling unit includes a shaft rotatably supported at the bottom of the negative pressure chamber.

3. The recording device according to claim 1, comprising an imparting member configured to impart to the abutting unit force causing the abutting unit to rotate in a direction in which the partition wall is brought into the closed state.

4. The recording device according to claim 3, wherein, when the partition wall is in the closed position, the imparting member imparts force to the abutting unit so that the abutting unit further rotates by the idle angle.

5. The recording device according to claim 3, wherein the force imparted by the imparting member to the abutting unit is greater than force with which a pressing member presses the partition wall.

6. The recording device according to claim 1, comprising a pressing member configured to press the partition wall in a direction in which the partition wall is brought into the open state.

7. The recording device according to claim 1, wherein the cam is in contact with the abutting unit when the partition wall is in the open position, and the cam is not in contact with the abutting unit when the partition wall is in the closed position.

8. The recording device according to claim 1, wherein the coupling unit is a rotating shaft that rotates around the rotation center.

9. The recording device according to claim 1, wherein a restricting portion configured to restrict displacement of the partition wall is provided at at least one of the open position and the closed position.

10. The recording device according to claim 1, comprising:

a frame to which the facing unit and the driving unit are attached; wherein the facing unit is provided so that a position of the facing unit is adjustable in a device height direction relative to the frame.

11. The recording device according to claim 1, wherein the partition mechanism divides the negative pressure chamber in a width direction intersecting a transport direction of the recording medium.

12. The recording device according to claim 1, comprising:

a suction unit configured to suck air in the negative pressure chamber; wherein a first amount of work of the suction unit when the negative pressure chamber is divided is less than a second amount of work of the suction unit when the negative pressure chamber is not divided.

* * * * *